Oct. 17, 1944.   H. A. SIMMONS   2,360,523
ELECTRICAL MEASURING APPARATUS
Filed May 15, 1943
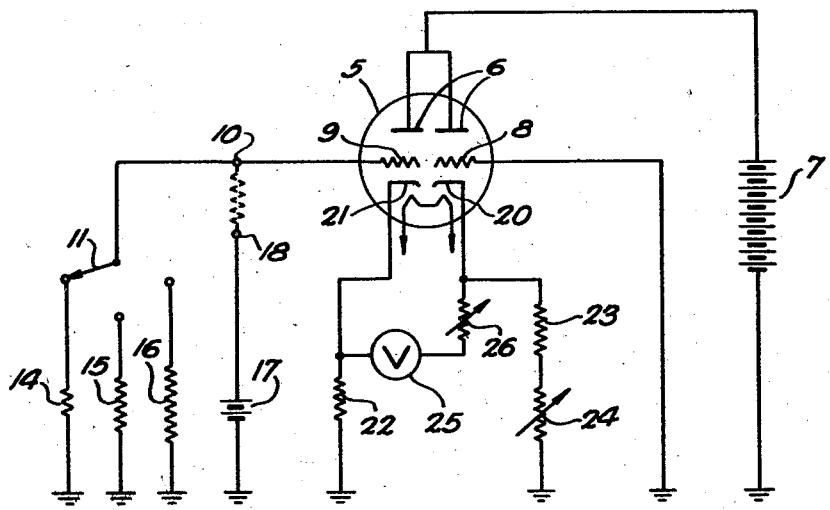
INVENTOR.
H. A. SIMMONS
BY
*Harry L. Duft*
ATTORNEY Patented Oct. 17, 1944

2,360,523

UNITED STATES PATENT OFFICE 2,360,523

ELECTRICAL MEASURING APPARATUS

Howard A. Simmons, Westchester, Ill., assignor to Western Electric Company, Incorporated, New York, N. Y., a corporation of New York Application May 15, 1943, Serial No. 487,130

6 Claims. (Cl. 171—95)

This invention relates to electrical measuring apparatus and more particularly to resistance measuring apparatus.

Heretofore, numerous testing devices have been available for measuring resistors having widely varying resistances. Ordinarily such testing devices are relatively expensive and delicate. Also few available resistance measuring devices are stable over long periods of operation.

An object of the present invention is to provide an effective and efficient electrical measuring apparatus.

In accordance with one embodiment of this invention, a resistance measuring apparatus may be provided employing a twin triode vacuum tube having the two plates thereof connected to a common source of plate current and having resistances connected between the cathodes and ground. When a positive potential is applied to one grid through a resistor being tested, a change in plate current occurs which produces a proportional change in the voltage of the associated cathode. A meter connects the cathodes and indicates the difference in potential therebetween.

Other objects and advantages of the present invention will be apparent from the following detailed description taken in conjunction with the single figure wherein a resistance measuring apparatus constructed in accordance with this invention is shown schematically.

Referring to the circuit drawing, it will be seen that a twin triode vacuum tube 5 is provided, having its two plates 6 connected to a common source 7 of plate current, such as a battery or a direct current generator. One of a pair of grids 8, associated with the tube, is grounded while the other grid 9, to which is connected a test terminal 10, is connected to a switch 11 by which one of three resistors 14, 15 or 16, which are connected to ground may be selected. These resistors are used in applying a positive voltage to the grid 9 from a battery 17, as will be explained.

The positive side of the battery 17 is connected to a second test terminal 18 and, thus, when a resistor to be tested is connected between the test terminals 10 and 18, a positive voltage is applied to the grid 9 proportional to the ratio of the resistance of the resistor being tested to that of the particular resistor of the group 14, 15 and 16 employed. With a resistor to be tested of low resistance, a relatively low resistance resistor of this group is used and, conversely, when a resistor having a high resistance is to be tested, a relatively high resistance resistor is used.

A pair of cathodes 20 and 21 are associated with the plates 6 and 9, respectively, and resistors are connected between these cathodes and ground, the cathode 21 being provided with a fixed resistor 22 while the cathode 20 is provided with two resistors 23 and 24 connected in series. The resistor 24 is variable and may be adjusted to match the impedance between the cathode 20 and ground with that between the cathode 21 and ground. In practice, if the resistor 22 has a resistance of approximately 3,000 ohms, the variable resistor 24 should be selected to have a maximum resistance on the order of 400 ohms, while the fixed resistor 23 will be selected to have a resistance on the order of 2800 ohms.

Before measuring the resistance of a resistor to be tested, the apparatus is adjusted to obtain an equal potential on either cathode when no potential is applied to the grid 9 from the battery 17. This is done by adjusting the variable resistor 24. When the potential on either cathode is the same as that on the other, no current flows through a meter 25 connected between the cathodes.

The test terminals 10 and 18 are then shorted to apply a potential from the battery 17 to the grid 9 and a small variable resistor 26, which is connected in series with the meter and between the cathodes 20 and 21, is adjusted to obtain full scale deflection of the meter. It will be understood that when a positive voltage is applied to the grid 9, a proportional increase occurs in the plate current of the associated plate, and the potential on the associated cathode 21 is also increased by a proportional amount, resulting in a slight inverse feedback. Because of the circuit employed, when the potential on the cathode 21 exceeds that on the cathode 20, a current flows through the meter. It appears that this causes an increase in the potential on the cathode 20 and while the grid 8, associated with the cathode 20, remains at a fixed potential, increasing the potential on the cathode 20 has the same effect as making the grid 8 more negative with respect thereto would have and, consequently, the flow of current from the cathode 20 to its associated plate is reduced. This in turn tends to amplify the difference indicated by the meter 25. Since this difference in potential is relatively large, a rugged meter, such as one drawing from one to eight milliamperes for full scale deflection, may be employed.

After the apparatus has been adjusted, as explained, the resistor to be tested is then connected between the test terminals. This causes a potential to be applied to the grid 9, which is, as aforesaid, proportional to the ratio of the resistance of the resistor being tested to that of the resistance of the particular resistor of the group 14, 15 and 16 employed. The difference in potential between the cathode 20 and cathode 21 causes current to flow through the meter 25 proportional thereto, and this current is indicated by the meter, which may have been previously calibrated as required to indicate the resistance of the resistor being tested.

This testing device is especially stable over long periods of operation. Since a common plate voltage is applied directly to both plates, variations in the voltage of the supply do not appreciably affect the accuracy of the meter reading since each plate is affected to the same extent as the other. Furthermore, the accuracy of the meter indication is unaffected by changes in the voltage of the grid battery 17 since changes in the voltage of this battery may be readily compensated by adjusting the variable resistor 26. the amount of current drawn from the battery 17 is so slight, however, that no substantial change in voltage occurs even over long periods of operation, and consequently adjustment of the variable resistor 26 is rarely required.

While this invention has been described in connection with a single twin triode vacuum tube, it will be apparent that two triode type vacuum tubes, or other tubes having similar operating characteristics, connected in parallel and having their plates connected to a common source of plate voltage, might also be used with substantially equal results, and although only three resistors have been shown and described for shunting test current, it will be understood that this is merely illustrative and that any number of resistances may be employed. Also, while this invention is primarily intended to be used to test resistors, it is equally useful as a voltmeter.

What is claimed is:

1. In an electrical measuring apparatus, a pair of anodes, a source of voltage connected thereto, a pair of cathodes associated with said anodes, an impedance connected to each cathode, indicating means connected between said cathodes, a pair of grids, means for applying a potential to be measured to one of said grids through a device being tested to actuate said indicating means, and means for maintaining the other grid at a constant potential.

2. In an electrical testing apparatus, a pair of anodes, means for applying uniform voltage thereto, a pair of cathodes, an impedance connected to each cathode, an indicating device connected between the cathodes, a pair of grids, means for applying a potential to be measured to one of said grids, the amount of said potential depending upon the resistance of the device being tested, and means for maintaining the other grid at a constant potential.

3. In an electrical measuring apparatus, a pair of anodes, a pair of cathodes associated with said anodes, an impedance connected to each cathode, indicating means connected between the cathodes, a pair of grids, means for applying a uniform voltage to the anodes, means for balancing the impedance connected to either cathode to obtain the same potential on both cathodes, means for applying a potential to be measured to one of said grids, and means for maintaining the other grid at a constant potential.

4. In an electrical measuring apparatus, a pair of anodes, means for applying uniform voltage thereto, a pair of cathodes, an impedance mounted to each cathode, an indicating device connected between the cathodes, a pair of grids, means for applying a potential to be measured to one of said grids, the amount of said potential depending upon the resistance of the device being tested, means for selectively varying this potential, and means for maintaining the other grid at a constant potential.

5. An electrical measuring apparatus including a pair of anodes and a pair of cathodes forming electric circuits, means for applying a uniform voltage to said anodes, grids associated with said circuits, biasing resistances connected to said cathodes, an indicating device connected between said cathodes and said resistances responsive to the difference of current values flowing in said resistances, means for applying a voltage to be measured to one of said grids, and means for maintaining the other grid at a constant potential.

6. An electrical measuring apparatus including a pair of anodes and a pair of cathodes forming electric circuits, grids associated therewith, biasing resistances connected to said cathodes, an indicating device connected between said cathodes and said resistances responsive to the difference in current values flowing in said resistances, means associated with said electronic means for applying a potential to be measured to one of said grids, and means for maintaining the other grid at a constant potential.

HOWARD A. SIMMONS.